United States Patent [19]
Kobayashi et al.

[11] Patent Number: 5,748,228
[45] Date of Patent: May 5, 1998

[54] IMAGE INFORMATION ENLARGING READING DEVICE

[75] Inventors: Kenichi Kobayashi; Seigo Makida; Yoshio Nishihara; Naoki Hiji, all of Ebina, Japan

[73] Assignee: Fuji Xerox Co., Ltd., Tokyo, Japan

[21] Appl. No.: 853,335

[22] Filed: May 8, 1997

Related U.S. Application Data

[63] Continuation of Ser. No. 667,911, Jun. 27, 1996, abandoned, which is a continuation of Ser. No. 428,013, Apr. 25, 1995, abandoned.

[30] Foreign Application Priority Data

May 27, 1994 [JP] Japan ................................ 6-136620

[51] Int. Cl.$^6$ ............................................. H04N 7/18
[52] U.S. Cl. ............................. 348/63; 382/114; 382/315
[58] Field of Search ........................... 348/63, 62, 373, 348/374, 376; 358/473, 474; 382/114, 298, 113, 313, 312, 315

[56] References Cited

U.S. PATENT DOCUMENTS

| | | | |
|---|---|---|---|
| 3,993,865 | 11/1976 | Browne et al. | 358/473 |
| 4,400,725 | 8/1983 | Tanigaki | 348/20 |
| 5,125,046 | 6/1992 | Siwoff | 348/63 |
| 5,212,567 | 5/1993 | Kawai et al. | 358/473 |
| 5,550,938 | 8/1996 | Hayakawa et al. | 382/114 |

FOREIGN PATENT DOCUMENTS

| | | | |
|---|---|---|---|
| 218177 | 10/1985 | Japan | 348/673 |
| 64-62980 | 3/1989 | Japan . | |
| 5-41866 | 2/1993 | Japan . | |

*Primary Examiner*—Amelia Au
*Attorney, Agent, or Firm*—Oliff & Berridge

[57] ABSTRACT

An image enlarging reading device includes an image inputting device including an image sensor and an image displaying device, for example, a liquid crystal display for displaying a whole or a part of image information inputted by the image inputting device. A reading portion of the image inputting device and a displaying portion of the image displaying device are positioned on a front side and a rear side respectively of the image enhancement display device with the displaying portion positioned over an area being read, that is, an area of image inputting. The image may be enhanced by enlargement of an input image to a magnified output image.

7 Claims, 10 Drawing Sheets

IMAGE INFORMATION ENLARGING READING DEVICE

This is a continuation of application Ser. No. 08/667,911 filed Jun. 27, 1996, now abandoned, which in turn is a continuation of application Ser. No. 08/428,013 filed Apr. 25, 1995, now abandoned.

FIELD OF THE INVENTION

The present invention relates to an image inputting and outputting device which carries out reading (image inputting) and displaying of images, and especially to an image information enlarging reading device which is effective for persons with low eyesight to read image information.

BACKGROUND OF THE INVENTION

Conventionally, as image information enlarging reading devices, there are systems using video cameras and television monitors. With one of such devices, reading is carried out by placing an object to be read, such as a book or a magazine under a fixed video camera and moving the object, watching an enlarged image displayed in a television monitor. As a portable image information enlarging reading device, as shown in Japanese unexamined patent publication Hei 5-41866, a system using a video camera and a liquid crystal display is proposed. With this device, a liquid crystal display and a video camera of a small size are received in the corresponding receiving portions of a case, which makes it portable. In use, the video camera is taken out, and the reading of images is carried out by placing the camera on an object to be read and moving it by hand.

However, with the former one of the above described image information enlarging reading devices, as reading is carried out by moving an object to be read and watching an enlarged image displayed in a television monitor, it is difficult to guess which portion of the object is being read and to read image information of different lines. Further, as the whole system is bulky, it cannot be carried freely.

With the latter one of the above described image information enlarging and reading devices, as reading is carried out by moving a video camera with respect to an object to be read and watching an enlarged image displayed in a liquid crystal display, it is also difficult to guess which portion of the object is being read and to read image information of different lines. Further, when it is carried, the liquid crystal display and video camera must be stored in a case, it is not easy to carry them.

The way wherein an image information enlarging reading device is used, the type and size of it and the environment wherein it is used are diverse, and the development of a device which is easy to use has been desired. As a person with poor eyesight tends to look at a displayed character or image, making himself close to a screen and it is preferable for him to use an image information enlarging reading device by himself so that he can use it freely, the one which is excellent in respect of portability has been desired. With the above described conventional image information enlarging reading devices, as an image inputting portion and enlarging displaying portion are separated, it is necessary to look at the object to be read and the enlarging displaying portion separately, which makes it difficult to use the devices.

SUMMARY OF THE INVENTION

It is an object of the present invention to provide an image inputting and outputting device free of the defects found in the conventional arts.

It is another object of the present invention to provide an image inputting and outputting device such as an image information enlarging reading device capable of being used easily and which is excellent in portability.

Additional objects and advantages of the invention will be set forth in part in the description which follows and in part will be apparent from the description, or may be learned by practice of the invention.

In one aspect of the present invention described in claim 1 to solve the above described conventional problems, the image inputting and outputting device comprises image inputting means and image displaying means for displaying the whole or a part of image information inputted by this image inputting means, and a reading portion of the image inputting means and a displaying portion of the image displaying means are provided, being combined so that they are the front side and the rear side respectively, and the displaying portion is positioned over the range being read, that is, the range of image inputting.

In another aspect of the present invention described in claim 2, the image inputting and outputting device described in claim 1 carries out enlarging displaying (displaying by enlargement) by the difference between the pixel density of the reading portion of the image inputting means and that of the displaying portion of the image displaying means.

In another aspect of the present invention described in claim 3, the image inputting and outputting device described in claim 1 carries out enlarging displaying by image processing, such as analog-digital conversion, of image signals obtained by the image inputting means.

In another aspect of the present invention described in claim 4, in the image inputting and outputting device described in claim 1, the image inputting means is a two-dimensional image sensor and the image displaying means is a flat panel display.

In another aspect of the present invention described in claim 5, displaying of information, which is carried out by the flat panel display described in claim 4, read by the two-dimensional image sensor, is carried out immediately after the reading of the two-dimensional image sensor.

According to the image inputting and outputting device described in claim 1, as the displaying portion is positioned over the range being read, that is, the range of image inputting, there is no difference between the place where the image is inputted and that where it is displayed, and one can look at the enlarged screen, looking at an object to be read, which makes it easy to confirm which portion of the image is now being read.

According to the image inputting and outputting device described in claim 2, enlarging displaying is carried out by the difference between the pixel density of the reading portion and that of the displaying portion, and an enlarging function can be obtained with a simple structure.

According to the image inputting and outputting device described in claim 3, as enlarging displaying is carried out in the image displaying means by processing image signals obtained by the image inputting means, a desired portion is enlarged by a desired magnification.

According to the image inputting and outputting device described in claim 4, enlarging displaying of an object to be read over a large range is possible by using a two-dimensional image sensor and a flat panel display.

According to the image inputting and outputting device described in claim 5, as displaying of information, which is carried out by the flat panel display described in claim 4, read by the two-dimensional image sensor is carried out immediately after the reading of the two-dimensional image sensor, it is possible to confirm which portion is being read, confirming the reading status simultaneously when reading a document or the like.

BRIEF DESCRIPTION OF THE DRAWINGS

The manner by which the above objects and the other objects, features and advantages of the preset invention are attained will be fully evident from the following detailed description when it is considered in light of the accompanying drawings, wherein.

DETAILED DESCRIPTION OF THE INVENTION

Embodiment 1

An image information enlarging reading device of a first embodiment according to the present invention is now described, referring to FIGS. 1 to 6.

Figure 3:
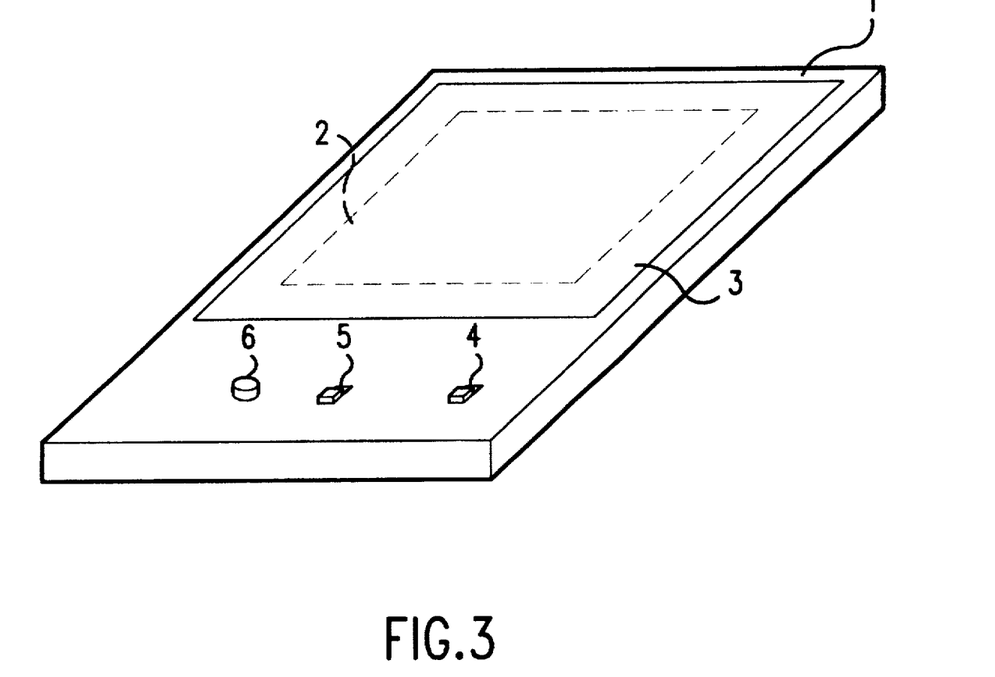
FIG. 3 is a perspective view of the image information enlarging reading device shown in FIG. 1.
Figure 4:
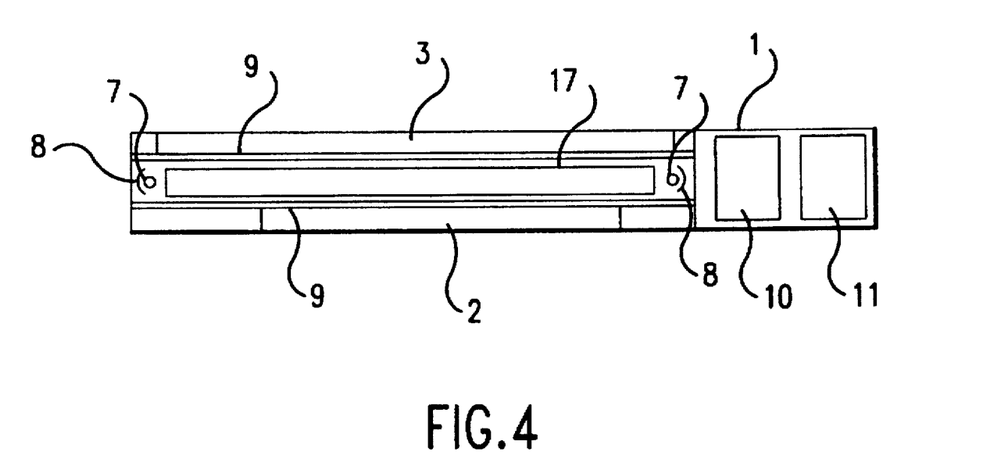
FIG. 4 is a cross-sectional view of the image information enlarging reading device shown in FIG. 1.

Two-dimensional contact type image sensor 2 is provided to the bottom part of the main body 1 of the image information enlarging reading device, as image inputting means, and liquid crystal display 3 capable of flat panel displaying is provided to the front surface of the main body as image displaying means. The image inputting portion of two-dimensional contact type image sensor 2 and the image displaying portion of liquid crystal display 3 are provided, as shown in FIGS. 3 and 4, so that they are parallel, and the displaying portion is positioned over the range being read, that is, the range of image inputting, by providing the image displaying portion immediately above the image inputting portion.

The image inputting portion of two-dimensional contact type image sensor 2 is A6-sized, the image displaying portion of liquid crystal display 3 is A5-sized, and the number of pixels of two-dimensional contact type image sensor 2 and that of liquid crystal display 3 is the same, that is, the pixel density of two-dimensional contact type image sensor 2 is higher than that of liquid crystal display 3.

Figure 1:
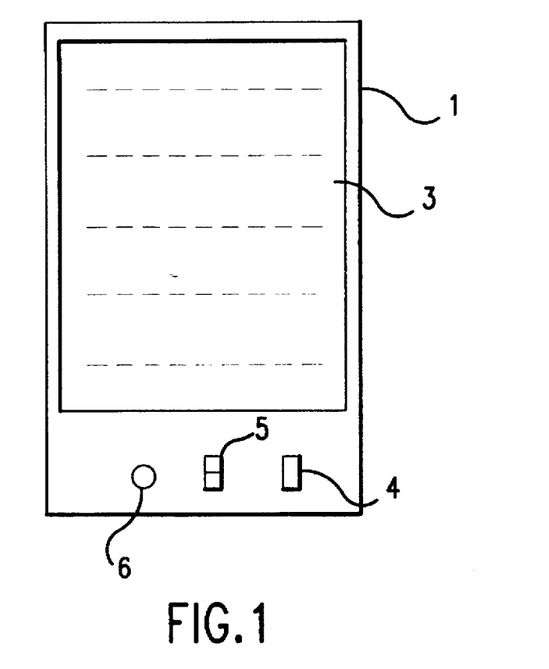
FIG. 1 shows an image information enlarging reading device, which is seen from above, according to a first embodiment of the present invention.
Figure 2:
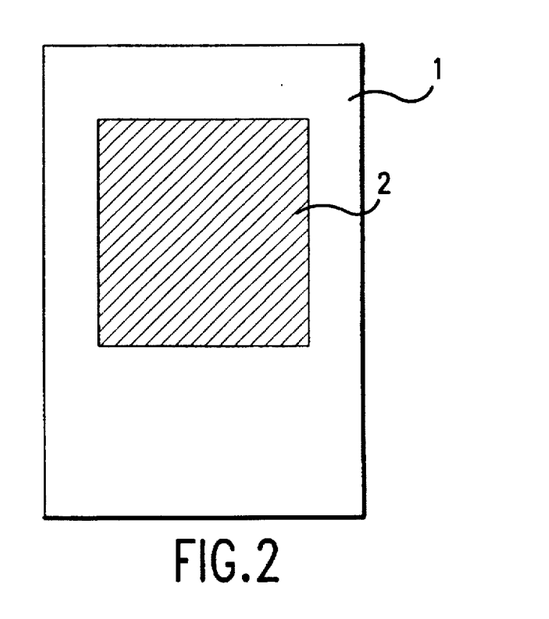
FIG. 2 shows the bottom part of the image information enlarging reading device shown in FIG. 1.

Power supply switch 4 for the image information enlarging reading device, image black/white inversion switch 5 for switching the display of characters and background, image brightness adjusting knob 6 for adjusting the brightness of displayed image are provided to the portion, which is nearer to an operator compared with the liquid crystal display 3, of the main body 1 of the image information enlarging reading device.

Inside the main body 1 of the image information enlarging reading device, two long light sources (cathode tubes) 7 which act both as illuminations for two-dimensional contact type image sensor 2 and backlights for liquid crystal display 3 are provided in parallel and at the same height. At the sides, which are opposite to the side of light-guiding plate 17, of each light source 7, reflection members 8 comprising plastic films and on which Ag or Al is deposited are provided, and they reflect the light from light sources 7 and converge the light toward the center of light-guiding plate 17.

The main body is structured so that the light from light sources 7 is conveyed uniformly to the upper surface of two-dimensional contact type image sensor 2 and the lower surface of liquid crystal display 3, by being provided diffusing plates 9 comprising polyester-based films to the upper surface of two-dimensional contact type image sensor 2 and the lower surface of liquid crystal display 3 and being provided light-guiding plate 17 comprising materials such as acrylic resin between light sources 7.

Further, processing circuit 10 for displaying, on liquid crystal display 3, image signals read by two-dimensional contact type image sensor 2 and power supply 11 are stored in the main body 1 of the image information enlarging reading device.

Two-dimensional contact type image sensor 2 is structured by laminating, by a thin film forming process, individual or common electrodes and a photoelectric transfer film such as amorphous silicon (amorphous silicon:a-Si) so that the photoelectric transfer film is sandwiched by the electrodes. This two-dimensional contact type image sensor 2 is, as described in Japanese unexamined patent publication Sho 64-62980, structured by aligning a plurality of photoreceptive elements, for example, the ones structured by laminating, by a thin film forming process, individual or common electrodes and a photoelectric transfer film such as amorphous silicon (amorphous silicon:a-Si) so that the photoelectric transfer film is sandwiched by the electrodes, two-dimensionally on a light-transmitting substrates and providing apertures between each photoreceptive element. The image information enlarging reading device is placed on a side, which is to be read, of a document, the document is positioned under the image sensor, the light from the light sources is transmitted through the apertures of the photoreceptive elements and then it is reflected on the surface of the document, the reflected light is received by the photoreceptive elements facing the document and an image of the document is read by photoelectric transfer, by which image information of a range of image inputting can be read without mechanical scanning means.

Figure 5:
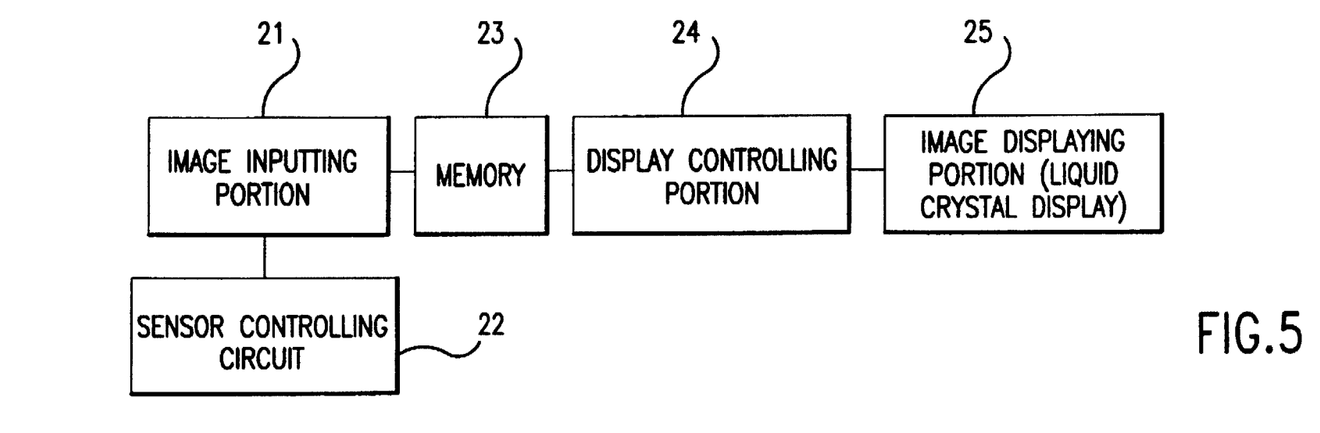
FIG. 5 is a block diagram showing the internal structure of the image information enlarging reading device shown in FIG. 1.

FIG. 5 is a block diagram showing the internal structure of the above described image information enlarging reading device.

Image inputting portion 21 of two-dimensional contact type image sensor 2 is driven by sensor controlling circuit 22, and the image read by image inputting portion 21 is once stored in memory 23 and it is displayed on image displaying portion 25 of liquid crystal display 3 by display controlling portion 24 of a microcomputer.

With the above described image information enlarging reading device, as the image inputting portion of two-dimensional contact type image sensor 2 is A6-sized, the image displaying portion of liquid crystal display 3 is A5-sized and the number of pixels of each portion is the same, when the whole image read by the image inputting portion is displayed as it is, the document image can be displayed on the image displaying portion, being enlarged 1.41 times as big as the original one.

Therefore, an image processing portion for enlargement is not necessary between memory 23 and display controlling portion 24.

Figure 6:
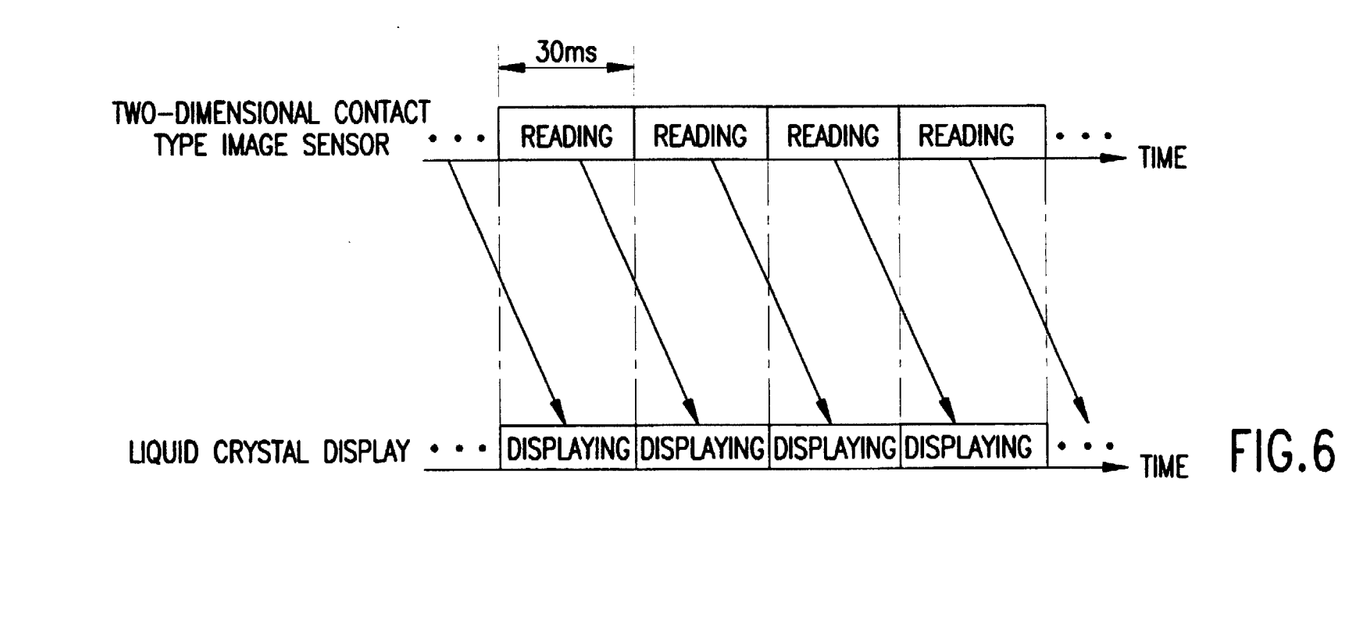
FIG. 6 is a timing chart concerning reading and displaying carried out by the image information enlarging reading device shown in FIG. 1.

The image information read by two-dimensional contact type image sensor 2 is first stored in memory 23 and then it is displayed on liquid crystal display 3. As for the displaying timing, as shown in FIG. 6, an image of the range of previous reading (image inputting) is displayed on liquid crystal display 3 while an image of the present range is being read by image sensor 2. As the reading time of image sensor 2 with respect to a range of image inputting is 30 ms, a time lag of 30 ms is caused between reading and displaying, but since the reading time with respect to a range of image inputting is short, the time lag is not realized when using the device, which makes real time displaying possible. Further, if the same image is repeatedly read by image sensor 2 (if the device is placed on the same page of the document), as the information to be read is the same, the same image is displayed repeatedly.

Therefore, when reading a document, the operator can confirm the portion, which is being read, of the document, confirming the reading status simultaneously, by which reading errors can be prevented.

Figure 7:
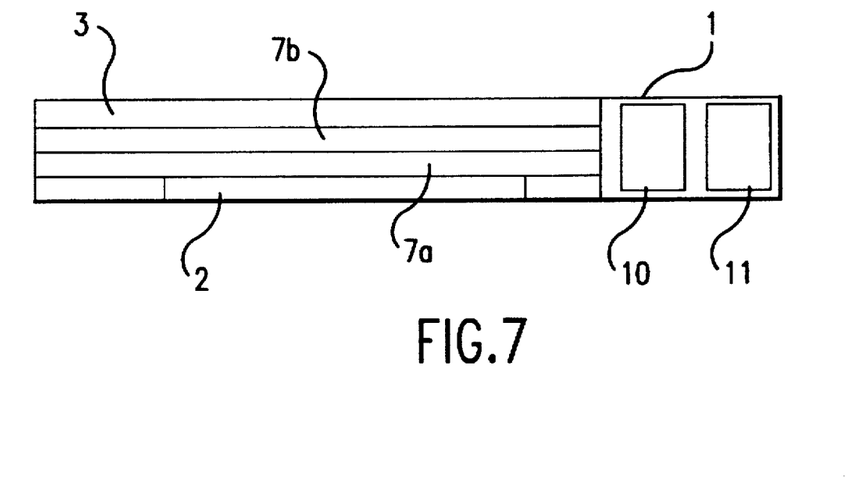
FIG. 7 is a cross-sectional view showing a modified embodiment of the image information enlarging reading device.

Although, with the above described device, light sources 7 act both as illuminations for two-dimensional contact type image sensor 2 and as backlights for liquid crystal display 3, light source for illuminating documents 7a and backlight for the liquid crystal display 7b can be provided separately as shown in FIG. 7. In FIG. 7, the same portions as shown in FIG. 4 are identified by the same reference indications.

Figure 8:
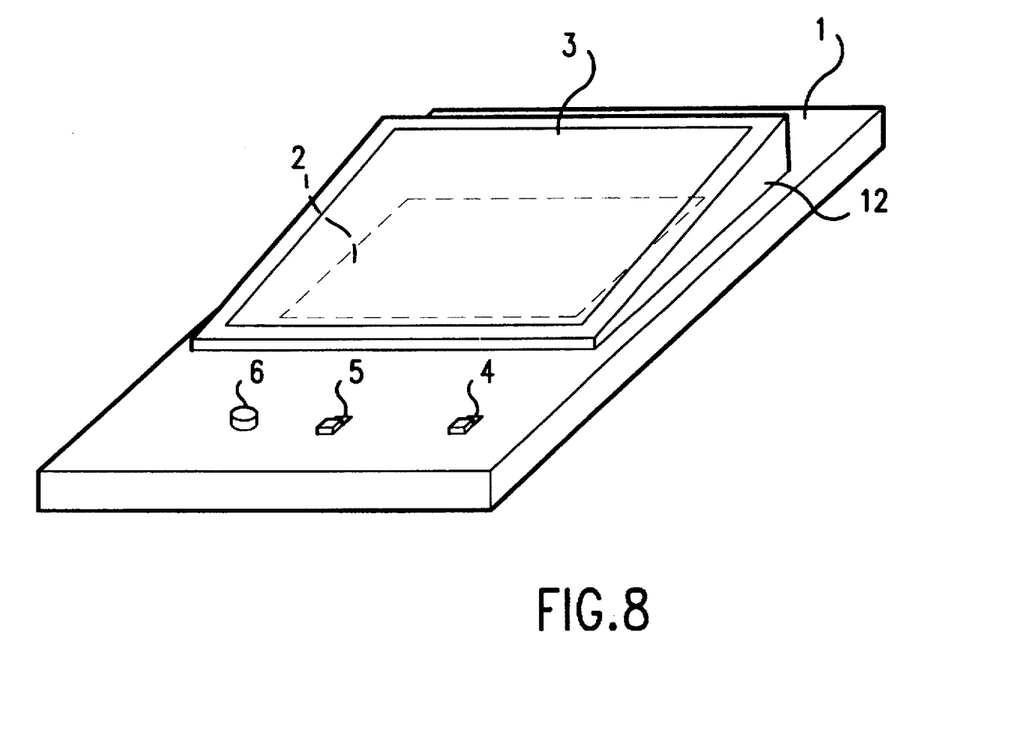
FIG. 8 is a perspective view showing another modified embodiment of the image information enlarging reading device.

Although, with an image information enlarging reading device according to the present invention, the image inputting portion of image sensor 2 and the image displaying portion of liquid crystal display 3 are provided in parallel, they can be provided so that the image displaying portion of liquid crystal display 3 is prominent and inclined with respect to the image inputting portion of image sensor 2, that is, a convex portion 12 whose height from the main body increases in accordance with the distance from the operator is provided on the main body and the image displaying portion of liquid crystal display 3 is provided to the surface of convex portion 12. In FIG. 8, the same portions as FIG. 3 are identified by the same reference indications.

With the above described embodiment, (including modified embodiments), as image sensor 2 and liquid crystal display 3 are combined, the size of the device can be reduced, which makes the device excellent in portability. Further, as the image displaying portion is positioned over a range of image inputting of image sensor 2, the operator can be aware of which image of the document is being inputted without taking his eyes off of the display. Yet further, as which portion of the original document the portion being enlarged corresponds to can be confirmed easily, the efficiency of using the device is improved, and it is possible to carry out enlarging displaying easily without moving the object to be read.

As both image sensor 2 and liquid crystal display 3 are document-sized though their sizes are different, high speed image reading is possible without moving the sensor by a driving system.

Embodiment 2

FIGS. 9 to 12 inclusive show a second embodiment of the image information enlarging reading device, and the same portions as shown in the above described first embodiment are identified by the same reference indications.

Figure 9:
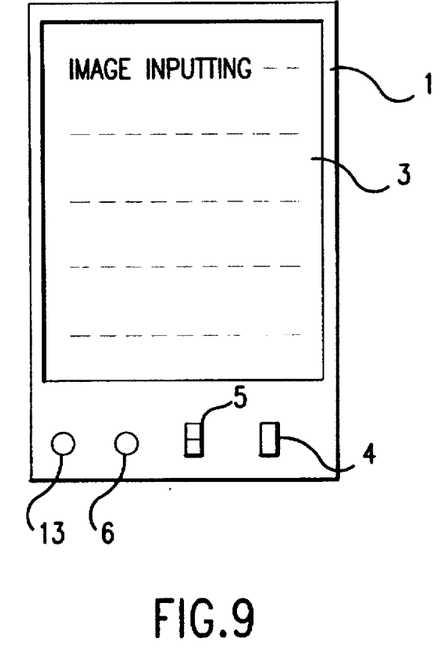
FIG. 9 shows an image information enlarging reading device, which is seen from above, according to a second embodiment of the present invention.
Figure 10:
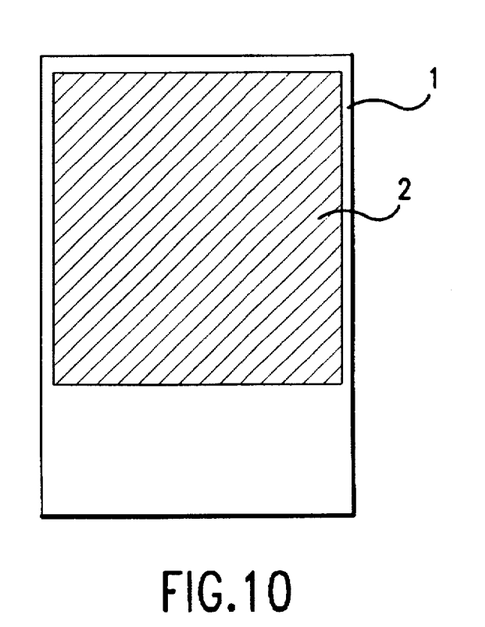
FIG. 10 shows the bottom part of the image information enlarging reading device shown in FIG. 9.
Figure 11:
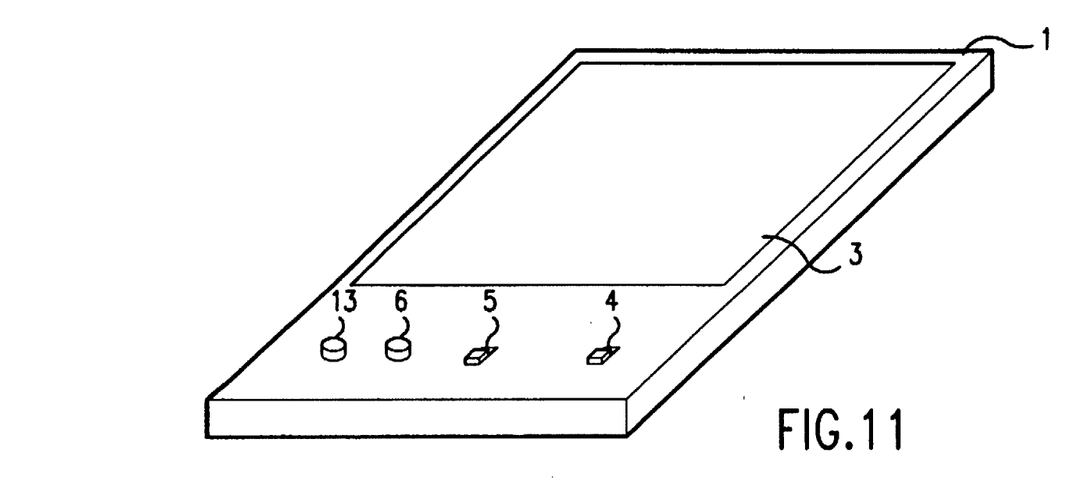
FIG. 11 is a perspective view of the image information enlarging reading device shown in FIG. 9.

With this image information enlarging reading device, as the one according to the first embodiment, two-dimensional contact type image sensor 2 is provided to the bottom part of the main body as image inputting means, and liquid crystal display 3 capable of flat panel displaying is provided to the front surface of the main body as image displaying means. The device is structured so that the image displaying portion of the liquid crystal display is positioned immediately above the range of the image inputting portion of image sensor 2.

Both image sensor 2 and the image displaying portion of liquid crystal display 3 are A4-sized, the number of pixels of image sensor 2 and that of liquid crystal display 3 are the same, the whole image read by the image inputting portion of image sensor 2 is displayed on the image displaying portion of liquid crystal display 3 with a magnification equal to the original document or with a local enlargement in the whole image read by the image inputting portion with a magnification equal to the original document.

In the portion, which is nearer to the operator compared with the liquid crystal display, of the main body, enlargement magnification adjusting knob 13 for predetermining the magnification of enlarging displaying is provided, adjacent to image brightness adjusting knob 6.

Figure 12:
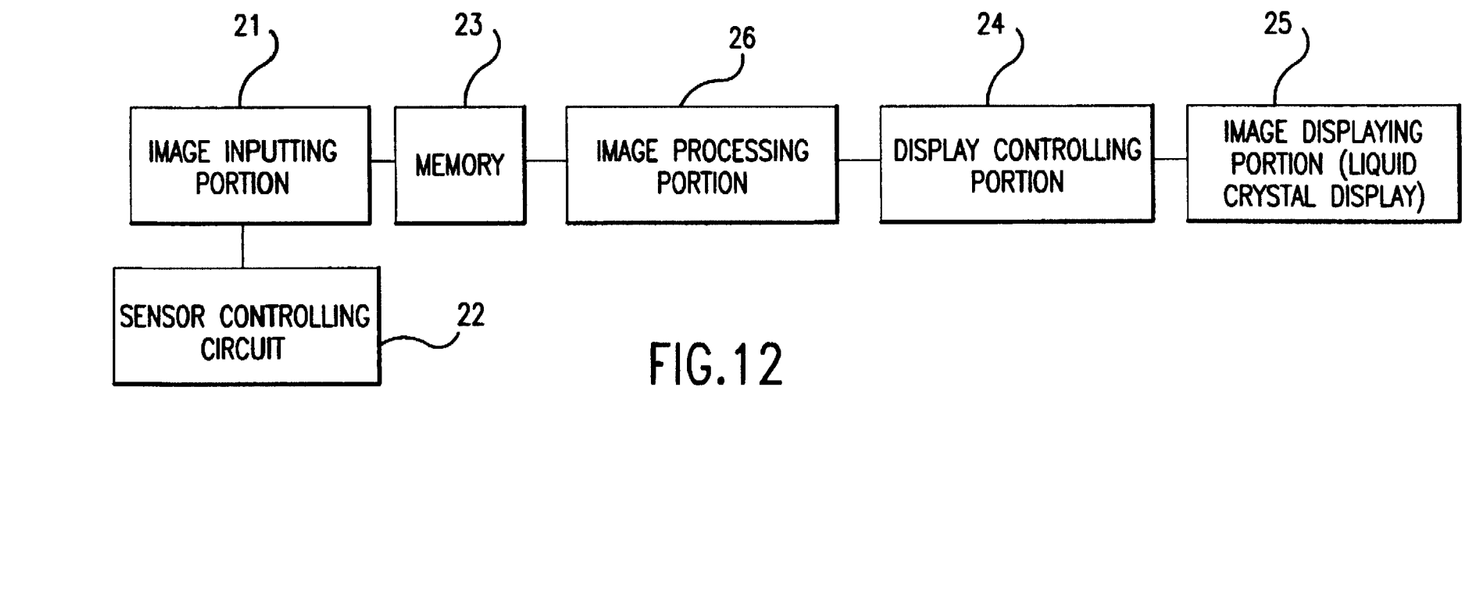
FIG. 12 is a block diagram showing the internal structure of the image information enlarging reading device shown in FIG. 9.

FIG. 12 is a block diagram showing the internal structure of the above described image information enlarging reading device. Image inputting portion 21 of two-dimensional contact type image sensor 2 is driven by sensor controlling circuit 22, the image read by the image inputting portion is once stored in memory 23 and it is displayed, being enlarged on image displaying portion 25 of liquid crystal display 3 by display controlling portion 24 though (by way of) image processing portion 26 which carries out operations such as predetermining magnification. Image processing portion 26 and display controlling portion 24 are microprocessors.

The image information read by image sensor 2 is first stored in memory 23, enlarged by image processing portion 26 is accordance with the magnification predetermined by enlargement magnification adjusting knob 13, and it is displayed on the image displaying portion of liquid crystal display 3 by display controlling portion 24. As for the displaying of the read image, it is displayed, being enlarged, in order from the upper left end on the image displaying portion.

Embodiment 3

FIGS. 13 to 19 inclusive show a third embodiment of the image information enlarging reading device according to the present invention, and the same portions as shown in the above described first and second embodiments are identified by the same reference indications.

Figure 13:
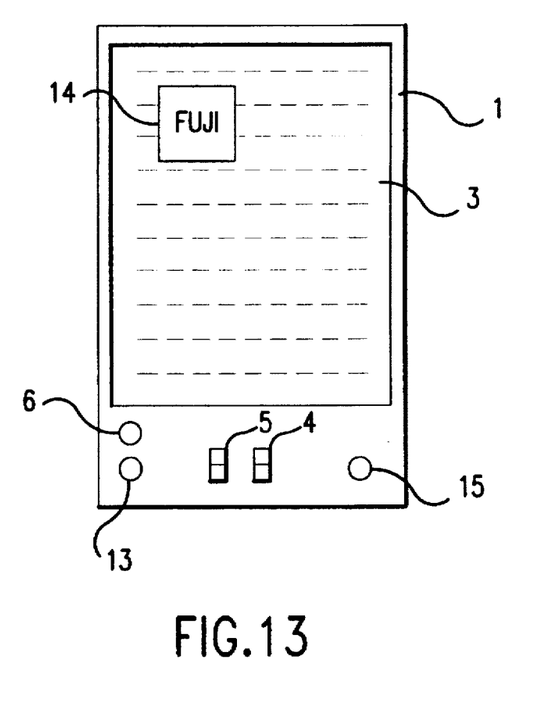
FIG. 13 shows an image information enlarging reading device, which is seen from above, according to a third embodiment of the present invention.
Figure 14:
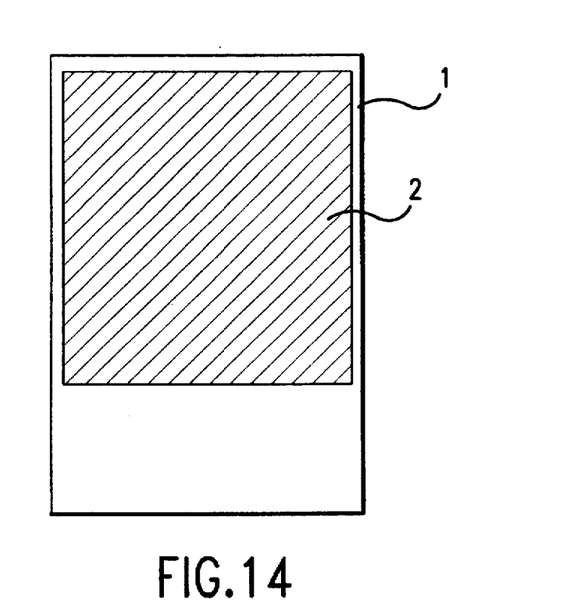
FIG. 14 shows the bottom part of the image information enlarging reading device shown in FIG. 13.
Figure 15:
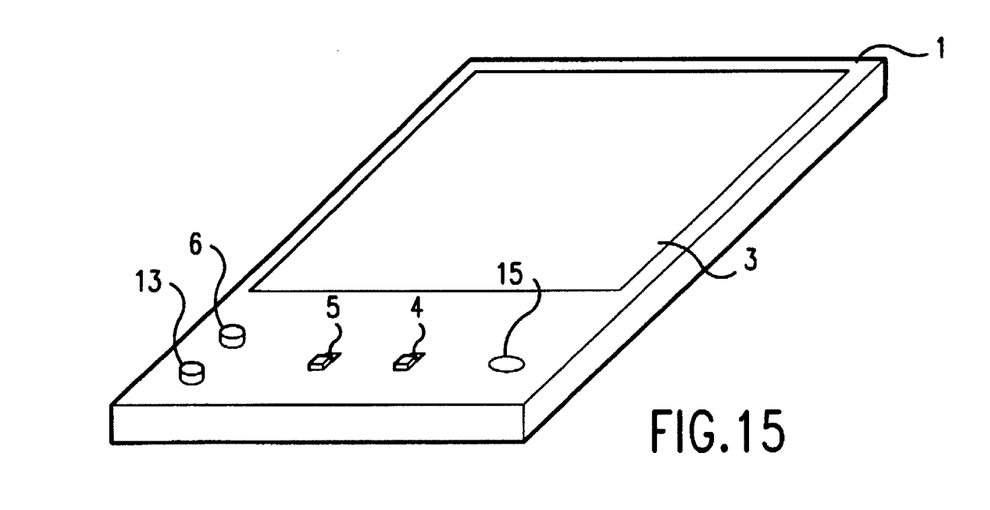
FIG. 15 is a perspective view of the image information enlarging reading device shown in FIG. 13.

With this device, as each device of the above described embodiments, two-dimensional contact type image sensor 2 is provided to the bottom part of the main body as image inputting means, and liquid crystal display 3 capable of flat panel displaying is provided to the front surface of the main body as image displaying means. The image inputting portion of image sensor 2 and the image displaying portion of liquid crystal display 3 are provided so that they are parallel, and the displaying portion is positioned over the range of image inputting of image sensor 2, by positioning the image displaying portion immediately above the image inputting portion.

Both of the image inputting portion image sensor 2 and the image displaying portion of liquid crystal display 3 are A4-sized, and the number of pixels of image sensor 2 and that of liquid crystal display 3 are the same. The whole image read by the image inputting portion of image sensor 2 is displayed on the image displaying portion of liquid crystal display 3 simultaneously.

In the image displaying portion, as shown in FIG. 13, a square enlarging displaying portion 14 of a predetermined area can be displayed in the whole image displayed with the same magnification as the original document.

Track ball 15 capable of rotating in desired directions is provided in the lower right end of the front surface, that is, the side of liquid crystal display 3 of the main body 1. The device is structured so that enlarging displaying portion 14 in the whole image displayed on liquid crystal display 3 with the same magnification as the original document is moved by rotating this track ball 15. Enlarging displaying portion 14 is to display the document image which is immediately below it, enlarging the image. Further, enlargement magnification adjusting knob 13 for predetermining the magnification of enlarging displaying of the above described enlarging displaying portion 14 is provided, being adjacent to image brightness adjusting knob 6.

Figure 16:
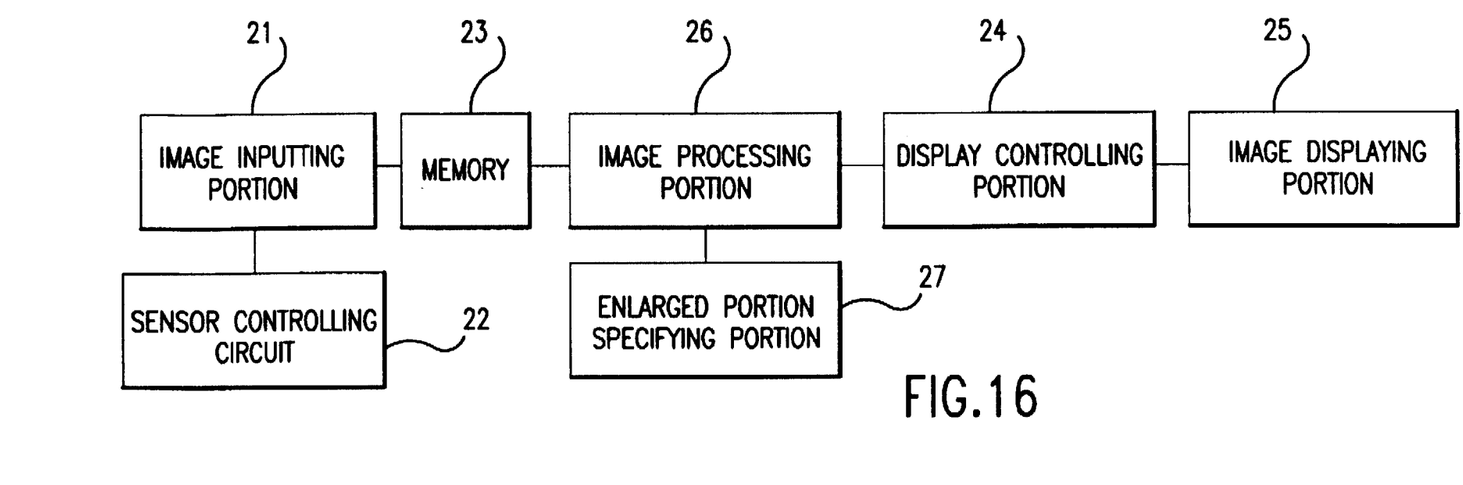
FIG. 16 is a block diagram showing the internal structure of the image information enlarging reading device showing in FIG. 13.

FIG. 16 is a block diagram showing the internal structure of the above described image information enlarging reading device. Image inputting portion 21 of image sensor 2 is driven by sensor controlling circuit 22, and the image read by image inputting portion 21 is first stored in memory 23. Image processing portion 26 enlarges the image stored in memory 23, based on the information, which is sent from enlarged portion specifying portion 27 to which positional signals are sent from track ball 15, concerning the portions to be enlarged and the information indicated by enlargement magnification adjusting knob 13. An enlarged image is displayed on image displaying portion 25 of liquid crystal display 3 by display controlling portion 24.

Image processing portion 26 and displaying controlling portion 24 are microcomputers.

The image information read by image sensor 2 is first stored in memory 23 and then a specified portion of it is enlarged in image processing portion 26, based on the indication, which is made in accordance with positional signals sent from track ball 15, of enlarged portion specifying portion 27 and the magnification specified by enlargement magnification adjusting knob 13, and the image information is displayed on the image displaying portion of liquid crystal display 3 by display controlling portion 24. Enlarging displaying portion 14 displays the document image which is positioned immediately below it, enlarging the image. Enlarging displaying can be realized by carrying out processing in accordance with the following algorithm.

Figure 17:
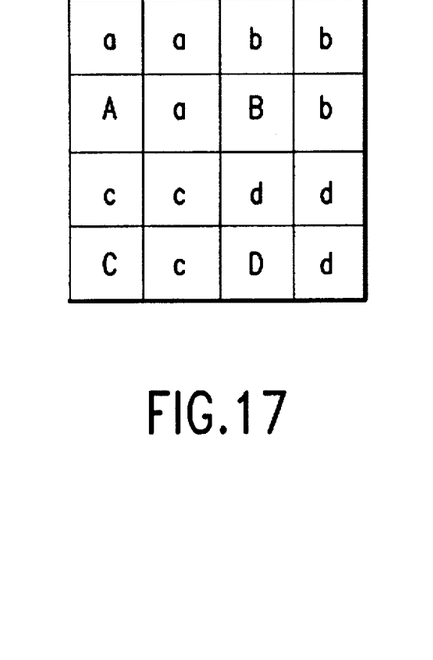
FIG. 17 shows an algorithm of enlarging displaying.

For example, as shown in FIG. 17, when a document image is enlarged with a magnification of 4, an enlarged image is obtained by regarding pixels a, b, c and d, each of which are provided adjacent to a pixel of the original images A, B, C or D, as A, B, C and D respectively.

In image processing portion 26, enlarging processing is carried out in accordance with an algorithm corresponding to each magnification.

According to this embodiment, as the whole image displayed with a magnification equal to the original document and an enlarged portion are displayed simultaneously and the portion being enlarged is known by the position of enlarging displaying portion 14, confirmation of the portion being enlarged in the whole image displayed can be carried out easily.

Figure 18:
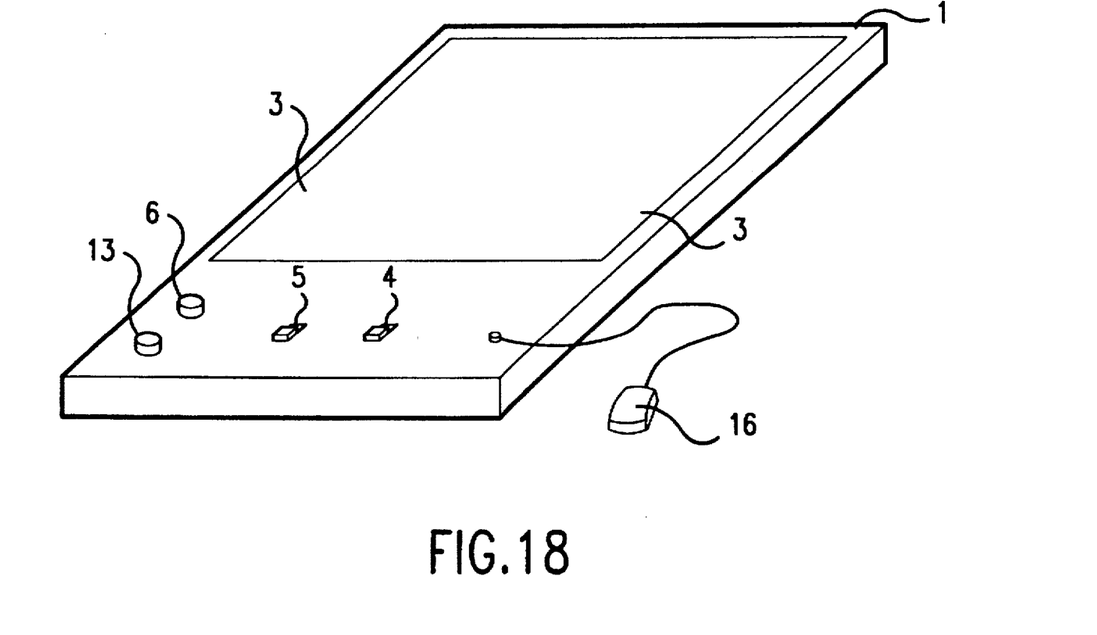
FIG. 18 is a perspective view of another modified embodiment of the image information enlarging reading device.

With an image information enlarging reading device according to the third embodiment, track ball 15 is used for enlarged portion specifying means, and enlarging displaying portion 14 can be moved by means of mouse 16 as shown in FIG. 18. The portions to be enlarged can also be specified by tracing liquid crystal display 3 over a touch panel provided on liquid crystal display 3 by something such as a finger.

Figure 19:
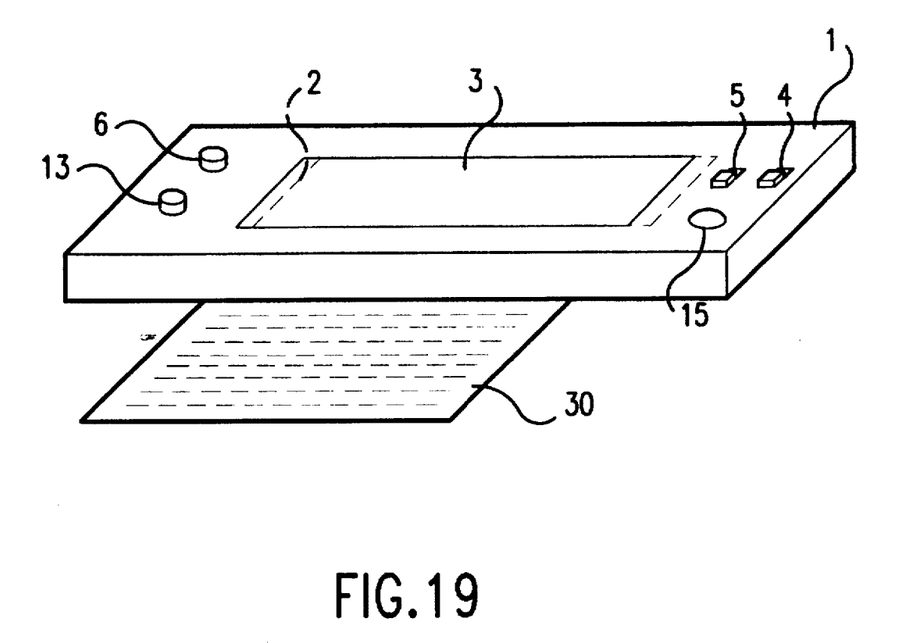
FIG. 19 shows a perspective view of another modified embodiment of the image information enlarging reading device.

In each of the above described first, second and third embodiments, the sizes of the image inputting portions of image sensor 2 are A4 to A6, and it is also possible to make the lateral length of image inputting portion A4, A5 or A6-sized as shown in FIG. 19 and to make the longitudinal length of it short. In this case, the size of the image displaying portion of display 3 is also reduced in accordance with the size of image sensor 2. In the figure, the same portions as shown in FIG. 15 are identified by the same reference indications.

With such an image information enlarging reading device, the range of image inputting for a single operation is some lines; the whole document 30 can be covered in respect of width (if The document to be read is A4, A5 or A6-sized, the device is to be moved not for each line but for some lines, which allows the device to be smaller and excellent in portability.

Further, although liquid crystal displays which have an advantage in respect of low power consumption and coloring images are used as image displaying means in each of the above described embodiments, ELD (Electroluminescence Display), PDP (Plasma Display Panel) or the like can also be used.

With the present invention, as an image displaying portion is positioned over the range of image inputting, there is no shift between the place where an image is inputted and where the image is displayed, and a user can look at an enlarging displaying screen, watching the object to be read. Therefore, the operator need not look at the object and enlarging displaying screen separately, he can confirm the enlarged portion in inputted image easily, and the efficiency of using the device is improved. Further, it can be smaller, thinner and lighter, which makes it excellent in portability.

Further, by comprising a two-dimensional image sensor as the image inputting means and a flat panel display as the image displaying portion, image reading is carried out at high speed without moving the sensor by a driving system.

Yet further, by reading and displaying an image information positioned immediately below the image information inputting and outputting device simultaneously, image reading can be carried out, confirming the portion being read simultaneously.

What is claimed is:

1. An image information enlarging device for assisting a reader comprising:

a planar body having a top surface, a bottom surface parallel to the top surface, and at least one side surface, each of said top and bottom surfaces having a surface area greater than the surface area of the at least one side surface;

image inputting means forming the bottom surface of the body, wherein said image inputting means is a non-mechanical scanning two-dimensional contact type image sensor;

image displaying means forming most of the top surface of the body for displaying all or a part of the image information inputted by said image inputting means; and an image inputting portion of said image inputting means and a displaying portion of said image displaying means, said displaying portion being positioned directly over and substantially parallel to said image inputting portion and the image information inputted, the information enlarging device further comprising means for enlarging information input by said image inputting portion of said image inputting means and displayed by said displaying portion of said image displaying means.

2. The image information enlarging device for assisting a reader described in claim 1, wherein the means for enlarging information carries out enlarging based on the difference between a pixel density of said image inputting portion of said image inputting means and that of said displaying portion of said image displaying means.

3. The image information enlarging device for assisting a reader described in claim 1, wherein the means for enlarging information carries out enlarging by image processing of image signals obtained by said image inputting means.

4. The image information enlarging device for assisting a reader described in claim 1, wherein said image inputting means is a two-dimensional image sensor and said image displaying means is a two-dimensional display.

5. The image information enlarging device for assisting a reader described in claim 1, wherein displaying of information, which is carried out by a two-dimensional display and input by a two-dimensional image sensor is carried out immediately after the inputting of said two-dimensional image sensor.

6. The image information enlarging device for assisting a reader described in claim 1, wherein said means for enlarging information includes means for displaying a whole image while simultaneously displaying an enlarged portion of said whole image.

7. The image information enlarging device for assisting a reader described in claim 6, further comprising means for varying the position of said enlarged portion relative to said whole image on said displaying portion.

* * * * *